UNITED STATES PATENT OFFICE.

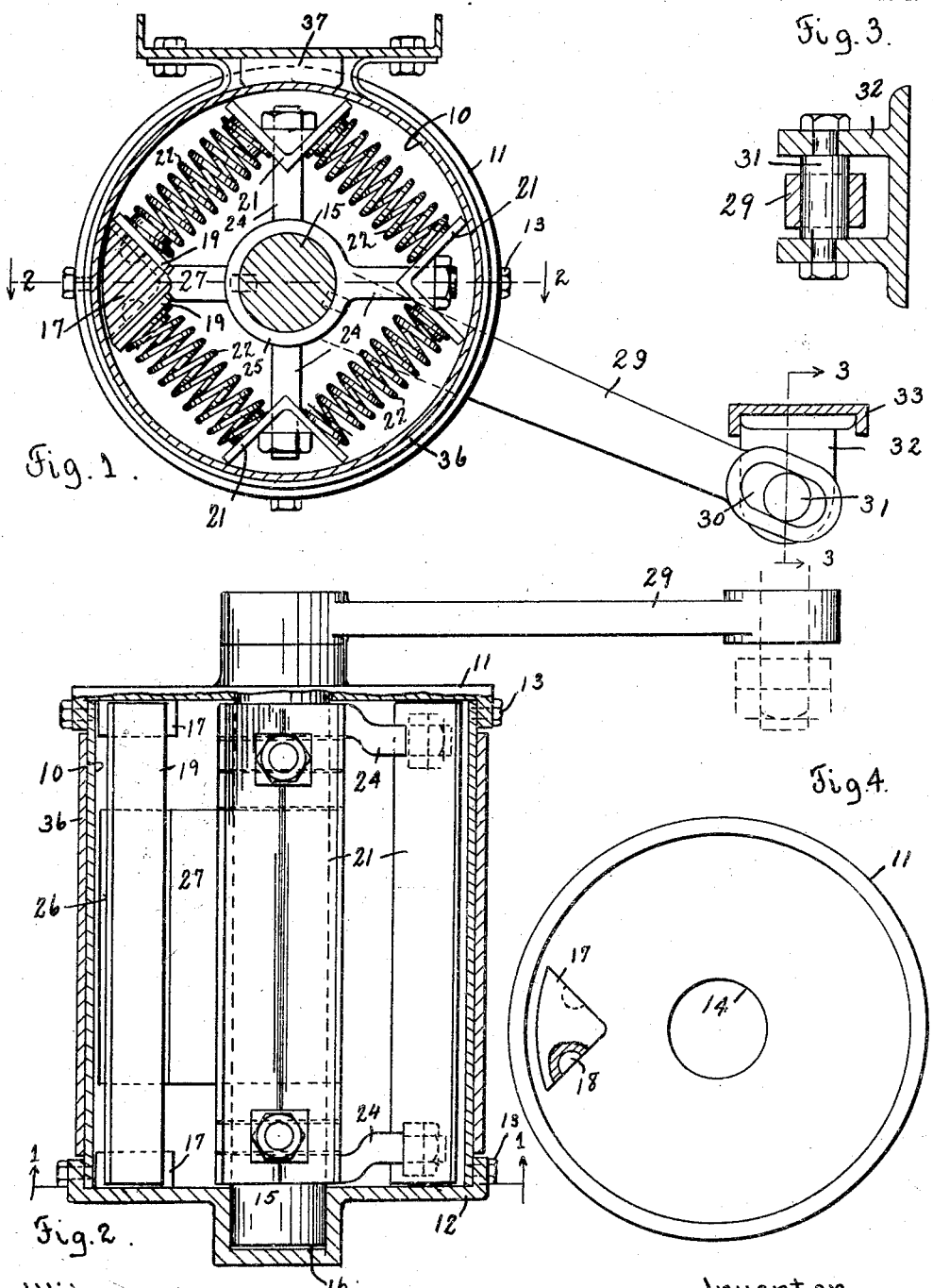

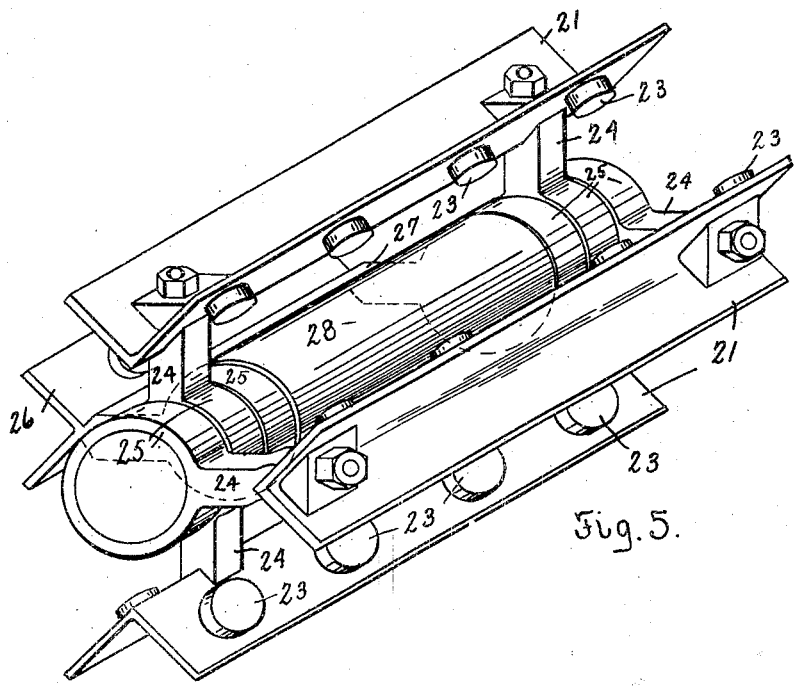
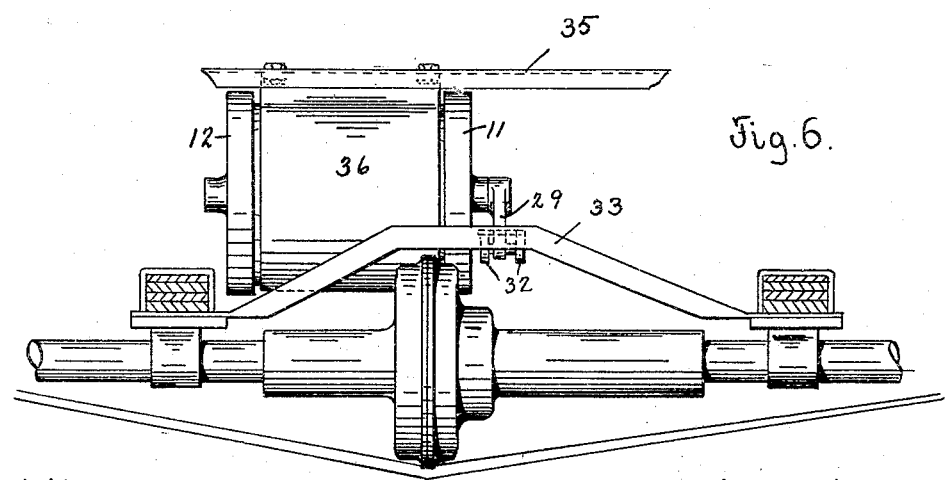

DELBERT HARTLEY, OF LOS ANGELES, CALIFORNIA.

SHOCK-ABSORBER.

1,043,827. Specification of Letters Patent. Patented Nov. 12, 1912.

Application filed May 4, 1912. Serial No. 695,075.

*To all whom it may concern:*

Be it known that I, DELBERT HARTLEY, a citizen of the United States, residing at the city of Los Angeles, county of Los Angeles, and State of California, have invented new and useful Improvements in Shock-Absorbers, of which the following is a specification.

My invention relates primarily to a shock absorber for automobiles and the object thereof is to produce an efficient shock absorber which will reduce the jar incident to going over an obstruction or into a depression and will also reduce the rebound of the body of the vehicle from the same causes. I accomplish this object by the device described herein and illustrated in the accompanying drawings forming a part hereof, in which:

Figure 1 is a section on the line 1—1 of Fig. 2. Fig. 2 is a section on the line 2—2 of Fig. 1 with the springs omitted. Fig. 3 is a section on the line 3—3 of Fig. 1. Fig. 4 is an inner end elevation of a closure cap. Fig. 5 is a perspective view of the control portion of my device with the springs omitted. Fig. 6 is an elevation of the rear axle and a portion of the body of the automobile with my device attached thereto.

In the drawings 10 is a tubular casing to the ends of which are securely fastened caps 11 and 12 preferably being secured by screws 13. Cap 11 has a central aperture 14 therein through which passes a shaft 15. The other end of shaft 15 passes into a central socket 16 in cap 12. Caps 11 and 12 have on their outer edges oppositely disposed inwardly projecting holding lugs 17 the faces of which are preferably provided with bar positioning sockets 18. Resting against these lugs and extending from cap to cap are the abutment bars 19 which have studs which enter the sockets 18 of the lugs and hold the bars properly positioned when in a state of rest. Equally spaced from the abutment bars are channel shaped spring bars 21. In the drawings I have shown three of these spring bars as I prefer that number. The opposed faces of these spring bars and the abutment bars are parallel and when arranged as shown in the drawings these faces are at an angle of 45 degrees to the radius of the casing which passes through the center of arms 24. Between the opposed faces are compression springs 22 arranged in circumferentially disposed sets. I have shown four sets of these springs but any desired number may be used depending upon the size of the springs and the length of the casing. These spring bars and the abutment bars are provided with spring holding lugs 23 which project from the faces thereof into the ends of the springs to hold the springs from slipping. The spring bars are provided near the ends with arms 24 whose inner ends are provided with hubs 25 through which is loosely passed shaft 15 when the parts are assembled. An abutment blade 26 of the same shape as the spring bars lies between the abutment bars and in contact therewith and is provided with an arm 27 the inner end of which terminates in a hub 28 which is keyed to shaft 15. The outer end of shaft 15 carries an operating lever 29 which is securely fastened to the shaft. The outer end is provided with an elongated aperture 30 through which passes a bolt 31 which also passes through bearings 32 fastened upon a truss rod 33 mounted upon the rear axle of the machine. The casing 10 is fastened to the car body 35 by a strap 36 of metal passed around it and having its ends bolted to the car body in such manner that when the nuts on the bolts are tightened the casing is held from turning. Between the ends of the strap and between the casing and the car body is a supporting block 37.

In the assembling of my device the abutment blade and the spring bars are threaded upon shaft 15. The springs are then placed in position and the parts placed in the casing. The end caps are then secured to the casing. The operating lever is then secured to the bearing on the strut rod with an equal play up and down. The casing is then secured to the body of the car. It will be understood that the springs are put in preferably under tension.

Should a car equipped with my device run over an obstruction or into a depression the first shock causes the body to approach nearer the axle. This movement is resisted by the springs in the casing. As soon as the body has been returned by the springs to the normal position the inertia of the body causes it to rise above its normal position which is the rebound movement. This rebound is opposed by the springs of the shock absorber. It will be observed that the same springs are compressed by each movement. This is rendered possible by the abutment bar on one side being prevented from movement by the lugs on the caps while the abutment bar on the other side is carried away from the lugs by the abutment blade.

I have described my shock absorber as applied to an automobile in which the body of the car is one of the main parts and the running gear is the other main part but it is equally adapted to any other vehicle where there is a spring connection between the body and the running gear.

Having described my invention what I claim is:

1. A shock absorber comprising a casing adjustably secured to one of the main parts of a vehicle; a plurality of compression springs within said casing, said springs being circumferentially arranged in said casing; an abutment secured to said casing, said abutment being adapted to hold one of the opposed ends of said springs against movement in a direction toward said abutment when power is applied to the other end of the springs to compress the springs; and means to compress said springs by pushing the ends thereof away from the abutment, said compression means being connected to the other main part of the vehicle.

2. A shock absorber comprising a tubular casing; end caps secured to said casing, one of said caps having a central socket and the other a central aperture; oppositely disposed holding lugs on said caps, said lugs projecting toward each other; abutment bars normally resting against said lugs; an operating shaft mounted in said socket and extending through said aperture; spring bars having arms terminating in hubs movably mounted on said shaft; a plurality of circumferentially disposed sets of compression springs arranged between said bars; an abutment blade having an arm terminating in a hub said hub being rigidly secured upon said shaft; means to adjustably secure said casing to the body of the vehicle; an operating lever rigidly secured to said shaft; and means to movably connect said lever to the running gear of the vehicle.

In witness that I claim the foregoing I have hereunto subscribed my name this 20th day of April, 1912.

DELBERT HARTLEY.

Witnesses:
  G. E. HARPHAM,
  FRANK WATERFIELD.